United States Patent

[11] 3,548,741

| [72] | Inventor | Ronald O. Wiley<br>2086 Middlebrook Road, Torrance, Calif. 90501 |
|---|---|---|
| [21] | Appl. No. | 679,908 |
| [22] | Filed | Nov. 1, 1967 |
| [45] | Patented | Dec. 22, 1970 |

[54] MOLD PRESS SPREADING APPARATUS AND METHOD THEREFOR
10 Claims, 4 Drawing Figs.

[52] U.S. Cl. .................................................. 100/35,
17/32, 29/200, 99/351, 100/265
[51] Int. Cl. ........................................................ B30b 13/00,
B30b 1/30
[50] Field of Search............................................ 100/35-
—39, 265, 266, 219, 140; 99/351; 214/(Inquired);
254/(Inquired); 25/(Inquired); 29/200D; 17/32

[56] References Cited
UNITED STATES PATENTS
| 423,545 | 3/1890 | Ams.............................. | 100/39X |
| 1,624,808 | 4/1927 | Scholten....................... | 99/351 |
| 2,059,938 | 11/1936 | Farber........................... | 100/265 |
| 2,565,245 | 8/1951 | Lebovitz........................ | 100/38 |
| 3,202,086 | 8/1965 | Brubaker....................... | 99/351 |

*Primary Examiner*—Peter Feldman
*Attorney*—Kendrick and Subkow

ABSTRACT: A spring-loaded meat mold is received within a mechanism having fixed and selectively actuatable clasps for securing its different parts in a spaced relationship. Pneumatic powering means is actuatable to move the so-held parts of the meat mold apart and maintain it in its second spaced relationship. A package of meat is then inserted between the spring biased portions of the meat mold. Finally, the mold parts are released, allowing them to be spring driven into compressive contacting relation to the meat package and release of the clasps then permits the meat package and mold to be removed as a unit. Unloading of the compressed meat package after cooking can be accomplished by this same apparatus.

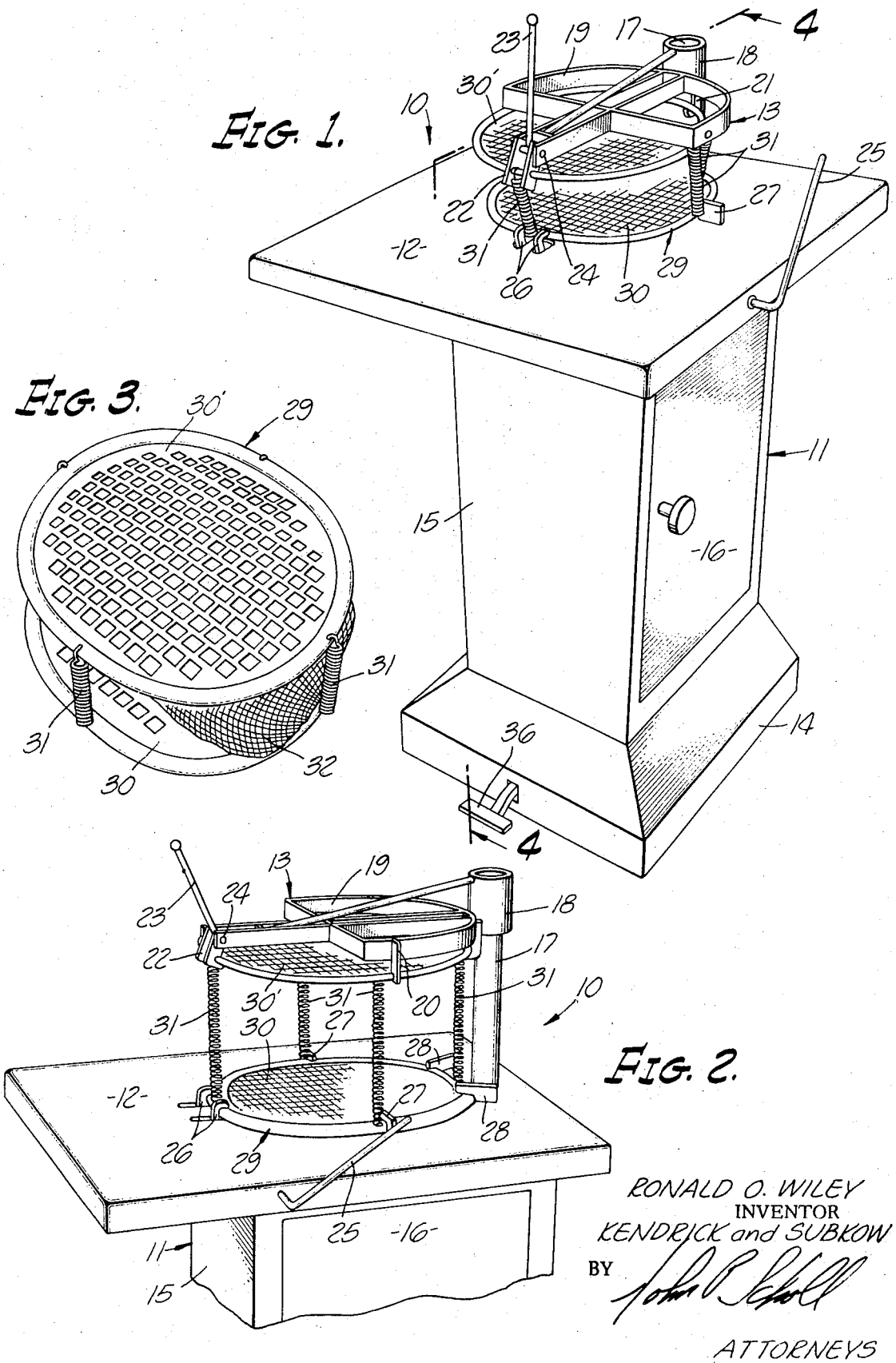

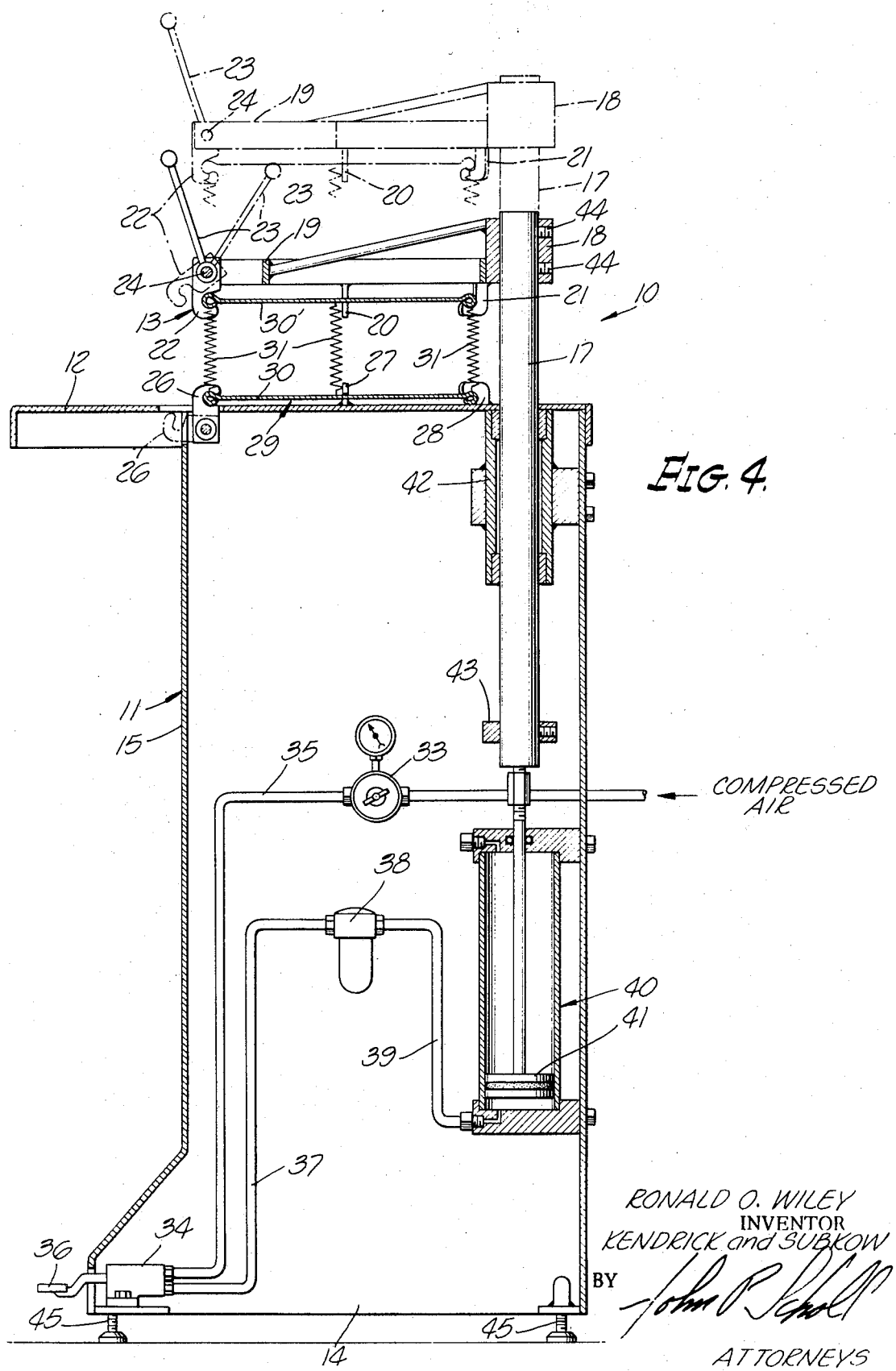

MOLD PRESS SPREADING APPARATUS AND METHOD THEREFOR

The present invention relates generally to the meat processing field and more particularly to a method of and apparatus for loading and unloading a spring-biased meat mold assembly.

BACKGROUND OF THE INVENTION

In the past it has been found to be desirable in the cooking of boneless hams and other meats to place the meat in a wrapping similar to a sock or bag and then insert the meat in a spring-biased meat mold assembly, which applies a pressure on the meat during the cooking operation. The spring-biased meat mold assembly has the effect of compressing the meat and forcing it into a compact, flat condition which is easier to handle and store and, eventually, easier to slice for preparation and serving.

The particular problem with which the invention herein-described is concerned is the loading and unloading of a spring-biased meat mold assembly. The meat mold assembly which has been used in the past consists of two grid plates, which hold the grid plates in a parallel position and generally exert a compressive force on any meat or other product inserted between the grid plates. In the past, to load the meat mold assembly the springs were removed by hand from the grid plates, and the meat was inserted between the plates. The springs were then reattached to the grid plates with some considerable difficulty. Again, when the meat mold was to be unloaded, the springs had to be removed from the grid plates, and the meat taken out of the mold assembly. Because of the fact that the springs were not permanently attached to the mold, the springs were difficult to handle and to put in place under tension and could become lost or broken in the process of loading and unloading the meat mold assembly.

It is, therefore, a primary object of the present invention to provide a method and apparatus for loading and unloading a meat mold assembly.

A further object of this invention is to provide a simplified apparatus and method for spreading a spring-loaded meat mold assembly not requiring the springs of the meat mold to be removed and/or replaced on a loading or unloading operation.

Another object is to provide a simple, mechanically operated means which retains the meat mold assembly against spring tension in an expanded position to facilitate loading and unloading.

Yet another object of the present invention is to provide apparatus for pneumatically spreading the meat mold assembly for purposes of unloading and loading.

SUMMARY OF THE INVENTION

The above-stated objects and features are attained, according to the present invention, by providing a vertical stand having a flat, horizontal surface or table. Integral with the table are both fixed and movable clasps to hold a bottom grid plate of a spring-biased meat mold assembly. The upper grid plate of the meat mold assembly is similarly held by fixed and movable clasps which are integral with an upper loading frame. The spreading of the grid plates is achieved by applying a force to the upper loading frame that is directed transverse to the plane of the grid plates. This force is applied to the frame through a vertical stanchion which, in turn, is powered by a pneumatic piston-cylinder apparatus.

DESCRIPTION OF THE DRAWINGS

FIG. 1 is a perspective view of the stand, table and loading assembly.

FIG. 2 is an enlarged side perspective view of the table and loading assembly of FIG. 1.

FIG. 3 is a perspective view of a conventional spring-biased meat mold assembly. Meat which has been encased in a wrapping has been inserted into the mold, and the mold is applying pressure to the meat.

FIG. 4 is an elevation, sectional view of the apparatus shown in FIG. 1, taken along line 4-4.

DESCRIPTION OF A PREFERRED EMBODIMENT

With reference now particularly to FIG. 1, there is shown a side perspective view of one form of apparatus of the invention 10 including in its major elements a vertical stand 11, horizontal table 12 and loading apparatus 13. The stand 11 is seen to be comprised generally of a rectangular base portion 14 and a central portion 15, the latter incorporating a door 16. The door provides access to the operating mechanism, which is more fully disclosed in FIG. 4 and details of which will be described later herein.

The loading apparatus 13 is shown in an enlarged view in FIG. 2 and is seen to include a vertical stanchion 17, a top collar 18 affixed to the stanchion, and an upper loading frame 19 affixed to the top collar 18. The frame 19 is provided with side clasps 20, end clasps 21, and a selectively adjustable clasp 22. The top selectable clasp 22 is positioned by means of a manually operated lever 23, which rotates the clasp 22 around a pin 24 moving the clasp into and out of retaining position.

Table 12 has affixed thereto a side lever 25 for operating a lower selectively adjustable clasp 26, the latter clasp being located in vertical registry with clasp 22. Also affixed to the table 12 are side clasps 27 and end clasps 28, which correspond to, and are in substantial registry with, clasps 20 and 21 of the frame 19.

FIG. 3 shows a conventional spring-biased meat mold assembly 29, which is comprised of grid plates 30 and 30' and coil springs 31. The meat 32, encased in a wrapping or conventional sack, is positioned between the spring-biased grid plates and placed under compressive force by the springs 31.

FIG. 4 shows a cutaway view of the apparatus shown in FIG. 1, along the line 4-4.

Compressed air, as shown in FIG. 4, passes through a conventional air pressure regulator 33 into a three-way valve 34, via conduit 35, which valve is operated by a pedal 36. When the pedal is depressed, compressed air is allowed to pass along conduit 37, through cylinder oiler assembly 38 and by an inlet pipe 39 into a vertically mounted, air operated cylinder assembly 40. The compressed air forces drive piston 41 vertically away from the no-load position. As the drive piston is forced vertically upward, it in turn moves the vertical stanchion 17 in an upward direction within journal 42, the latter being mounted on the central housing 15 of the vertical stand 11.

Upward travel of stanchion 17 is limited by bottom collar 43. This collar is fixedly located on the stanchion at a predetermined position by means of a setscrew, as shown in FIG. 4. When the bottom collar abuts against the bottom of journal 42, this limits the upward travel of stanchion 17.

The top collar 18 is mounted on vertical stanchion 17 by means of setscrews 44. Upper loading frame 19, previously described herein, is integral with the top collar 18 and is thereby moved by the vertical motion of stanchion 17.

The positioning of collar 18 on stanchion 17 governs the minimum distance between upper frame 19 and table 12. Accordingly, the collar should be located such that the frame 19 is the correct height above table 12, so that top grid plate 30' of an unloaded spring-biased meat mold will fit into the side clasps 20, and end clasps 21, and the bottom grid plate 30 of the meat mold will similarly fit into bottom side clasps 27 and bottom end clasps 28 when vertical stanchion 17 is at the bottom of its travel. This travel of stanchion 17 is also governed by the positioning of air operated cylinder assembly 40.

Since all of springs 31 are identical in size, shape and length, the grid plates 30 and 30' of spring-biased meat mold 29 will be generally parallel when the mold is in an unloaded condition. As a result thereof, when the top grid plate 30' is fitted into top side clasps 20 and top end clasps 21, and bottom grid plate 30 is at the same time fitted into bottom side clasps 27 and bottom end clasps 28, the operator can rotate lever 23 and have top selectable clasp 22 engage the top grid plate and similarly rotation of side lever 25 will cause selectively adjustable clasps 26 to engage bottom grid plate 30, as previously described herein.

To operate the apparatus of this invention, an empty spring-biased meat mold assembly is positioned as shown in FIG. 4, such that the bottom end clasps 28 and the bottom side clasps 27 engage lower grid plate 30 of the mold assembly. At the same time, the upper grid plate 30' is engaged by the top end clasp 21 and the top side clasps 20. The upper grid plate of the spring-biased meat mold assembly is then fixed in position by rotating lever 23, as shown in FIG. 2. Rotation of lever 25, in turn, rotates the bottom selectively adjustable clasp 26 shown in the phantomed line drawing from the unengaged position to the engaged position, wherein such clasps lockingly engage the bottom grid plate 30. The spring-biased meat mold assembly 29 is now firmly held in the loading apparatus of the present invention and is in condition for the spreading operation.

To spread or separate the grid plates of the spring-biased meat mold assembly along a line transverse to the plane of the grid plates, the operator depresses pedal 36, which permits compressed air to pass through the cylinder oiler assembly and into the air-operated cylinder assembly. The compressed air, in turn, forces drive piston 41 in an upward direction. Drive piston 41, as previously mentioned, is attached to vertical stanchion 17. Upward movement of vertical stanchion 17 through journal 42 is transmitted through top collar 18 to the upper loading frame 19. The upward motion continues until bottom collar 43 abuts against journal 42. At this point the grid plates of spring-biased meat mold 29 are spread the required distance and can receive the meat package 32 between the parallel plates, as shown in FIG. 3.

When the meat has been placed between the grid plates, the operator releases the pedal 36, which shuts off the incoming compressed air and vents the compressed air held in the air-operated cylinder assembly thereby permitting the drive piston to travel in a downward direction. The drive piston is forced in a downward direction by reason of the weight of the vertical stanchion 17 and the loading apparatus 13, as well as by the tension in springs 31. When the vertical stanchion 17 has returned to the no-load or lowermost position, the operator then rotates top lever 23 from the solid line position to the phantomed line position, thereby disengaging top, adjustable clasps 22. Finally, the operator rotates bottom side lever 25 to disengage adjustable clasp 26. The spring-biased meat mold, with the meat in position, is then slid out of the loading apparatus and is taken to the oven, where it is cooked for a prescribed period.

To unload the spring-biased meat mold assembly, the operator depresses pedal 36 to raise the loading apparatus sufficiently to permit the loaded meat mold to be slipped part way therein. The operator then releases pedal 36 and the loading apparatus is allowed to lower down to the level of the top grid plate 30' of the loaded meat mold. At this point the meat mold is pushed into the loading assembly such that top side clasps 20 and top end clasp 21 engage the top grid plate 30' and bottom slide clasps 27 and bottom end clasps 28 engage bottom grid plate 30. The operator again rotates lever 25 to engage bottom selectively adjustable clasps and lever 23 is actuated to engage top selectively adjustable clasp 22. The operator again depresses pedal 36, causing the mold to expand as previously described to the optimum distance governed by bottom collar 43, and the meat is removed from the spring-biased meat mold. Finally, upon release of pedal 36, the meat mold assembly is allowed to return to the no-load position and the empty meat mold can be unloaded from the apparatus by rotating levers 23 and 25.

Leveling screws 45 are used in a conventional way to permit adjustment of the plane of table 12 of the apparatus of this invention to accommodate for uneven or slanting floor conditions.

A preferred embodiment of the apparatus of this invention has been illustrated and described herein. Numerous variations of this apparatus which have not been illustrated will be apparent to those skilled in the art. For instance, the top loading frame might be held stationary while the bottom frame is moved; or, as an alternative, both the top loading frame and the table might be moved at the same time to accomplish the spreading of the spring-biased meat mold. Similarly, there are numerous combinations of fixed and selectively adjustable clasps which could be utilized to hold the grid plates of the spring-biased meat mold assembly in position during the spreading operation, which have not been illustrated although the arrangement in the preferred form is believed to represent an optimum from both the standpoints of function achieved and ease of operation.

I claim:

1. In an apparatus for loading a meat mold, said mold having two spring-biased grid plates, the improvement comprising:
   means for releasably holding a first grid plate;
   means for releasably holding the second of said grid plates; and
   means for spreading the said grid plates against the tension of the springs, whereby packaged meat can be inserted or removed from said mold, wherein the first means includes a flat surface with fixed clasps attached thereto to receive a first grid plate and a selectively adjustable clasp to hold the first grid plate in combination with said fixed clasps in a predetermined position against the spring bias of the meat mold.

2. In an apparatus as described in claim 1, wherein the second means includes an adjustable loading frame substantially parallel to and spaced from the flat surface of said first means, which loading frame incorporates fixed clasps and at least one selectively adjustable clasp to hold the second grid plate.

3. In an apparatus as described in claim 2, wherein the means for spreading said grid plates includes a pneumatically driven piston means which forces the first and second means apart.

4. In an apparatus for loading a meat mold, said mold having two spring-biased grid plates, the improvement comprising:
   means for releasably holding a first grid plate;
   means for releasably holding the second of said grid plates; and
   means for spreading the said grid plates against the tension of the springs, whereby packaged meat can be inserted or removed from said mold, wherein the means for spreading said grid plates includes a pneumatically driven piston means which forces the first and and second means apart.

5. In an apparatus as described in claim 4, wherein the spacing at which said grid plates are spread is selectively adjustable.

6. In an apparatus for loading a meat mold, said mold having two spring-biased grid plates, the improvement comprising:
   a fixed platform which incorporates fixed and selectively adjustable clasps for retaining a first grid plate of said meat mold;
   a second movable platform which incorporates fixed and selectively adjustable clasps to hold a second grid plate;
   a stanchion attached to said movable platform to impart a separating motion to said second grid plate and move said second grid plate away from said first grid plate, to facilitate loading of said spring-biased meat mold assembly; and
   means to impel said stanchion.

7. In an apparatus as described in claim 6, wherein the means to impel the stanchion include:
   a pneumatic cylinder assembly attached to said stanchion; and
   a three-way air valve to selectively direct compressed air into and out of said pneumatic cylinder assembly.

8. In an apparatus as described in claim 7, wherein:
   the selectively adjustable clasps incorporated in said fixed platform are rotatable into and out of engagement with the first grid plate; and the selectively adjustable clasps incorporated in the second movable platform are rotatable into and out of engagement with the second grid plate.

9. A method for loading a spring-biased meat mold, comprising the steps of:

securing the top and bottom grid plates of said meat mold in a substantially parallel position at a loading station;

applying a force to one of said grid plates to separate it from the other;

holding said grid plates in a spaced relationship under spring tension;

placing the meat between said grid plates;

releasing said force tending to separate said grid plates; and removing the grid plates containing the meat from the loading station.

10. The method as described in claim 9, wherein the step of securing the top and bottom grid plates further includes:

engaging said top and bottom grid plates with fixed clasps;

rotating selectively adjustable clasps into contact with said top and bottom grid plates;

and wherein the step of removing the grid plates from the loading station includes rotating selectively adjustable clasps out of contact with said top and bottom grid plates; and disengaging said top and bottom grid plates with fixed clasps.